United States Patent

Purchase et al.

Patent Number: 6,163,745
Date of Patent: Dec. 19, 2000

[54] GUIDANCE SYSTEM FOR AUTOMATED VEHICLES, AND GUIDANCE STRIP FOR USE THEREWITH

[75] Inventors: F. Jack Purchase, Unionville; Ross A. Poole, Newmarket, both of Canada

[73] Assignee: Ainsworth Inc., Aurora, Canada

[21] Appl. No.: 09/060,134

[22] Filed: Apr. 15, 1998

Related U.S. Application Data

[60] Provisional application No. 60/043,346, Apr. 15, 1997.

[51] Int. Cl.[7] .................................................. G05D 1/02
[52] U.S. Cl. ............................. 701/23; 701/28; 318/580
[58] Field of Search ................................. 701/23, 28, 41, 701/42; 318/580, 587; 180/168; 252/301.27, 301.33, 301.6 P

[56] References Cited

U.S. PATENT DOCUMENTS

| | | | |
|---|---|---|---|
| 4,307,791 | 12/1981 | De Bruine | 180/168 |
| 4,707,297 | 11/1987 | Paske, Jr. et al. | 252/301.16 |
| 4,862,047 | 8/1989 | Suzuki et al. | 318/587 |
| 4,947,094 | 8/1990 | Dyer et al. | 318/587 |
| 5,530,330 | 6/1996 | Baiden et al. | 318/580 |

FOREIGN PATENT DOCUMENTS

| | | |
|---|---|---|
| 2049773 | 2/1993 | Canada . |
| 2041373 | 11/1993 | Canada . |
| 2145731 | 10/1995 | Canada . |

*Primary Examiner*—Tan Nguyen
*Attorney, Agent, or Firm*—Bereskin & Parr

[57] ABSTRACT

The vehicle guidance system is provided for guiding a vehicle, such as a load haul dump vehicle in an underground mine. An elongate element, for example in the form of a rope or the like is aligned with the path of the vehicle and is suspended above the path. The element includes a fluorescent material which absorbs radiation at one frequency and radiates radiation at a second, lower frequency. The vehicle includes a lamp for illuminating the element at the first frequency, e.g. ultraviolet light, and a camera or other detector to detect the second frequency, which may be in the visible spectrum, radiated from the elongate element. The relative position of the elongate element and the image provided by the detector is used to steer the vehicle to keep it on the desired path. The elongate element can be provided with portions that radiate different frequencies in response to the first frequency, which different frequencies are used to provide additional information, e.g. an indication of branch paths.

20 Claims, 3 Drawing Sheets

GUIDANCE SYSTEM FOR AUTOMATED VEHICLES, AND GUIDANCE STRIP FOR USE THEREWITH

CROSS-REFERENCE TO RELATED APPLICATION

This application claims benefit from United States provisional application Ser. No. 60/043,346 filed on Apr. 15, 1997.

FIELD OF THE INVENTION

This invention relates to a guidance system for automated vehicles. It is more particularly concerned with some elongate device or means which will define a path along which an automated vehicle is to travel. Even more particularly, this invention is concerned with the guidance of automated vehicles in a mine environment.

BACKGROUND OF THE INVENTION

The use of automated or driverless vehicles is becoming more widespread. Such vehicles are commonly used in a variety of industrial settings, where it is desired to have one or more vehicles travel a set route, or defined network of routes. In such situations, automated vehicles offer considerable advantages and cost savings.

By automating vehicle operation, the cost of having an individual operator for each vehicle is avoided. Where the vehicles are repeatedly traversing relatively short routes, this is tedious for the operator, and operator boredom and fatigue can be a problem. By automating guidance of the vehicle, in many cases, the vehicle can be guided more consistently and accurately, and this can be useful in environments where there are tight clearances.

Such automated guidance systems have been developed for use in factories and the like. To keep the design of the guidance system simple and robust, a common element of most systems is to provide some clear indication of the path or route along which the vehicle is to travel. This avoids having to provide the vehicle with any complex computer system, artificial intelligence or the like, which enables it to determine the route to take.

In factories and the like, defining a route for the vehicle is a relatively simple matter. More importantly, the route or routes are usually fixed or set, and it is simply a matter of making a single installation of some device marking the route. One known technique is to provide a wire or cable embedded into the floor of a factory. A guidance system then uses the electromagnetic characteristics of this cable to guide the vehicle so that the vehicle follows the path of the cable. It is also known to use optical techniques and a strip painted on the floor.

More recently, there have been proposals to provide such automated vehicle guidance systems for use in a mine. A mining environment poses a wholly different set of problems from a conventional industrial setting. Firstly, the whole environment is much harsher than a conventional factory. Frequently, there are high levels of dust, and any path or route rather than being along a smooth, concrete floor or the like may well be a long rough floor of a tunnel or drift.

Additionally, in a mine, there are problems of electrical power supply. Again, in a conventional industrial plant, electrical power is usually readily available.

A further factor is that, in a mine, by its very nature, the pathways of the vehicle are irregular and subject to constant change. In a factory setting, the initial installation cost of the system defining the route or path of the vehicle is not usually critical, since it is a one time cost. In a mine, on the other hand, where the route or path must be constantly changed and updated, the cost of installing devices or equipment to define the route is an extremely important factor.

Nonetheless, despite these numerous differences between an industrial setting and a mining environment, many guidance systems proposed for mines make little or no allowance for these differences. Thus, one technique is to borrow the optical guidance technique used elsewhere. It is recognized that providing some sort of path along the floor of a drift is impractical in mind, and it would often be subject to severe damage or simply covered in debris.

Instead, it has been proposed to provide an elongate reflective strip suspended above the desired path for a vehicle. Such an arrangement is taught in Canadian Patent 2,041,373 (Mintronics Systems Corporation). This provides a so-called coded longitudinal reference means, which more specifically is retroreflective. There are various proprietary tapes available which provide such retroreflective capability. While this solution may appear relatively simple and practical, it does not totally solve all of the problems. The strip itself still needs to be hung at regular intervals, and must be oriented downwardly to a reasonable degree of accuracy.

The intention is that the reflective strip would be detected by lasers. The lasers are oscillated from side to side, and the position of the laser is noted when a beam is returned to the vehicle.

However, this arrangement has numerous disadvantages. Firstly, it requires lasers and a relatively delicate mechanism for causing the lasers to oscillate. Providing such a mechanism that is robust enough to withstand the typical working conditions of a mine is extremely difficult, and many mechanical failures have been encountered.

A more significant problem is that a retroreflective strip does not, in fact, provide an adequately bright return signal to enable it to provide a positive and accurate guidance system for the vehicle. In particular, as a vehicles speed increases, it is standard practice to cause the guidance system to look further ahead, so as to anticipate turns in the path.

In a mine, a drift will have the minimum height possible, so that a laser has to be shone forward so that is strikes the reflective strip at a fairly shallow acute angle. This in turn gives a poor reflected signal. Additionally, mine environments are typically cluttered. Along many drifts or tunnels, there are numerous other linear objects, e.g. pipes, duct work, cabling etc, all of which are capable of acting in a reflective manner. It is therefore quite easy for the guidance system to be confused by all the other objects suspended from the roof of a drift, which provide background clutter.

This problem has been recognized, and others have proposed solutions to it. In particular, Canadian Patent Application 2,145,731 discloses an automated guidance system for a vehicle which provides a continuous source of light arranged parallel to the intended path and above the vehicle. Such a source of light can be what is known as a "light rope". This is a commercially available product comprising numerous small bulbs encapsulated to form, in effect, a continuous rope or string.

This system certainly has a number of advantages. It provides a continuous, bright source of light, which is easily recognised by a vision and guidance system. It avoids all of the problems of interference by reflectance from background objects.

However, such a system is extremely costly both to install and to maintain. At current prices, it can cost around C$10.00 per foot and requires about 5 W of power per foot. In one large installation of which the applicants are aware, the installation cost was of the order of $300,000.00, and the completed installation required 100 kW of power.

Providing power at this sort of level down a mine is extremely difficult, complex and costly. In sizable installations, it results in strategies requiring sections of the available routes to be turned on and off as required, so as to minimize power requirements. This leads to complications, and stranding of vehicles, if the power is accidently turned off. It imposes a significant maintenance burden, since the light rope must be monitored, and sections replaced as bulbs fail.

To this end, to maximize the life of the light rope, some unusual precautions are taken. The voltage is reduced. Additionally, it has been discovered that in a blasting environment, the bulb filaments are much more robust when warm and much less susceptible to failure, so that the lights are maintained switched on when blasting occurs.

As noted, by its very nature, a mine environment requires continuous creation of new drifts and routes, and closure of old ones. This requires constant installation and removal of a guidance system. Where this light rope system is used, this requires the light rope and associated transformers, power supplies etc., all to be moved and relocated.

This light rope approach has enjoyed some considerable commercial success, but this only serves to underscore the limitations of the retroreflective tape approach. What is really required is some technique for defining a route for a vehicle in a mine, or other environment, which enables a route to be quickly and accurately defined, which is inexpensive to maintain and install, and which ensures accurate tracking of the route by a vehicle.

SUMMARY OF THE INVENTION

In accordance with the present invention, there is provided a vehicle guidance system, for use with a vehicle which includes at least one steerable wheel and steering actuation means for steering each steerable wheel, the vehicle guidance system comprising: an elongate element aligned with a desired path for the vehicle, mounted along the path and including a fluorescent material which absorbs radiation at a first frequency and radiates radiation at a second, lower frequency; illumination means for mounting on the vehicle and for illuminating the elongate element with radiation at the first frequency; detection means, for mounting on the vehicle, and for receiving and detecting radiation from the elongate element at the second frequency to provide positional information, indicating a position of the vehicle relative to the elongate element; a main control unit for determining the location of the vehicle relative to the desired path from the positional information from the detection means, and for controlling the steering actuation means to cause the vehicle to follow the desired path, the main control unit being adapted for connection to the detection means and the steering actuation means.

Preferably, the elongate element is flexible and adapted to be suspended from at least one of a roof and a wall around the desired path, more preferably from the roof directly above the desired path. The elongate element can comprise a tube formed from plastics material with the fluorescent material embedded in the plastics material.

Advantageously, the elongate element includes a first portion which radiates radiation at the second, lower frequency, and at least one other portion which absorbs the radiation at the first frequency and radiates radiation at another frequency different from the second frequency and the frequency of radiation emitted from each other portion. The detection means and the main control unit are then adapted to distinguish between the different frequencies emitted by the different portions of the elongate element. Then, a plurality of different portions of the elongate element having different radiation frequencies can be configured to provide information to the main control unit, at desired locations. For example, each portion of the elongate element can be associated with a respective path, and the main control unit can utilize the different frequencies received from the different portions of the elongate element to distinguish the different paths from one another and to guide the vehicle along the desired path.

Another aspect of the present invention provides an excitation means for driving the illumination means, which excitation means causes the illumination means to provide a series of pulses at a known, control frequency, and wherein the system includes a filter means for filtering out signals outside the control frequency, thereby to remove any interfering signals. The filter means being connected between the detector means and the main control unit.

Preferably, the detection means comprises a video camera means, which provides control information to the main control unit in the form of data representing an image indicating the relative location of the elongate element to the vehicle, and two cameras can be provided for forward and rearward movement.

In accordance with another aspect of the present invention, there is provided a method of remotely guiding a vehicle, the method comprising the steps of:

(a) providing an elongate element aligned with a desired path for the vehicle and including a fluorescent material which absorbs radiation of a first frequency and radiates radiation at a second, lower frequency;

(b) propelling a vehicle along the desired path;

(c) illuminating the elongate element with radiation of the first frequency;

(d) detecting radiation of the second frequency emitted from the elongate element, to determine the position of the vehicle relative to the elongate element and thereby to determine the vehicle's position relative to the desired path; and (e) in dependence upon the vehicle's relative position to the desired path, steering the vehicle, so that the vehicle travels along the desired path.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention and in which.

DETAILED DESCRIPTION OF THE INVENTION

Figure 1:
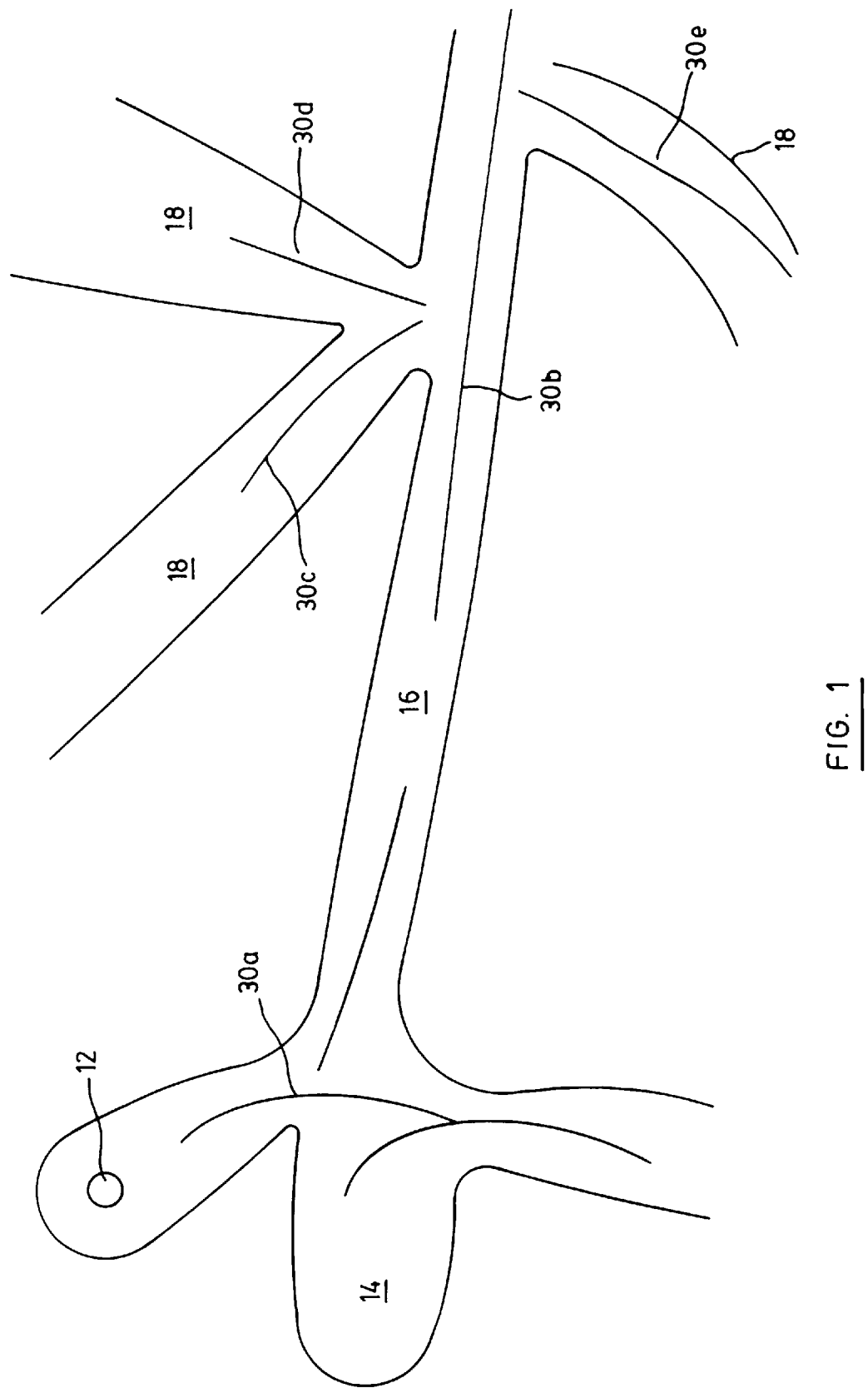
FIG. 1 is a plan view of an exemplary mine plan.

Referring first to FIG. 1, there is shown an exemplary schematic of a mine or part of a mine. It should be appreciated that this mine plan is purely exemplary, and that the invention is generally applicable to any mine layout. Moreover, the invention is not restricted to use in underground mines, but is applicable to guidance of vehicles in any situation, particularly in harsh conditions where the ground surface tends to be rough and cluttered.

In FIG. 1, the section of the mine shown has an entrance 10 and a dumping point 12. Shown adjacent the dumping point 12 is a garage 14 for a load haul dump (LHD) vehicle, which may be a Scooptram (Registered Trademark) as manufactured by Wagner Inc. From the entrance 10, a main drift 16 extends, and there are numerous branch drifts or tunnels 18 branching off from the main drift 16. A typical LHD vehicle 20 is shown in greater detail in FIG. 2. Its key elements are described in detail below.

Now, in accordance with the present invention, there is provided an elongate fluorescent element 30 extending along the routes or pathways that it is desired for the LHD vehicle 20 to follow. The elongate element 30 includes a material that is fluorescent and/or phosphorescent. Desirably, it is fluorescent, i.e. it absorbs radiation of one wave length and essentially immediately reradiates it as a radiation of a second, longer wave length. This, as detailed below, enables a vehicle guidance system to follow the element 30.

It is additionally desirable that the element 30 have some phosphorescent properties, that is to say it reradiates radiation of a certain wave length, some time after having been radiated itself. The reradiated radiation should be in the visible spectrum. This has the advantage that, some time after a vehicle has passed, the element will still continue to glow. At least in the confines of an underground mine, only a very low level of radiation is necessary from the element 30 for it to be visible by a miner. This has considerable safety advantages. If a miner walking along a drift notices that the element 30 has some residual glow or phosphorescence, then this indicates that a vehicle has passed that way recently, and is likely to be returning along that drift again. In other words, a miner should only feel comfortable walking along a drift where the guidance element 30 is essentially dark.

The element 30 comprises numerous separate portions. For ease of reference, these are designated below as 30a, 30b etc. Thus, there is a portion 30a at the entrance to the mine. This extends to the dumping point 12 and into the garage 14. From the dumping point 12, a main portion 30b extends along the main drift 16. Extending off from the main portion 30b are various branch portions 30c, 30d and 30e.

Guidance and recognition of the individual branch portions can be provided in various ways. Thus, one simple technique is to provide some distance markers along the length of the main branch portion 30b, so that the guidance system aboard the LHD vehicle 20 knows, at all times, where the vehicle is to the required degree of accuracy. These distance markers could be additional portions of the element 30 provided adjacent the main guidance portion, so as to be capable of being "read" by a guidance system.

However, a further aspect of the present invention provides a fluorescent element 30 that is provided in different types, each of which reradiates a different frequency or wave length, all in response to radiation of a single frequency. Thus, the main portion 30b could reradiate radiation at a second frequency, the branch portion 30c could radiate radiation at a third frequency, the branch portion 30d could radiate radiation at a fourth frequency and so on, with all the second and additional frequencies being different.

Then, it is not necessary for the vehicle guidance system to know exactly where the vehicle is. Rather, in order to instruct the vehicle to follow a particular branch, it is simply necessary to instruct the guidance system to look for a branch with a certain frequency characteristic. In other words, if it is desired for the vehicle to travel down the branch portion 30d, then the guidance system is instructed to follow the main branch 30b until it encounters a branch portion showing the fourth frequency. This branch portion 30d is then followed.

It will also be appreciated that this provision of a fluorescent element 30 having different radiation characteristics enables various information to be encoded along the length of say the main branch 30a in a completely linear fashion. In other words, it is not necessary to provide any additional pieces of the element 30 adjacent the main piece, forming a sort of bar code, as has been proposed elsewhere. It is noted that the provision of such additional pieces could confuse the guidance system.

By way of example, if it is desired to have some distance indications, distance markers could be provided by alternating the different types of fluorescent element in short lengths. Thus, a first distance marker could comprise two short pieces of the element 30 radiating at the second frequency interposed into the main portion 30b, which otherwise radiates at the first frequency. Ideally, these pieces should be short enough that they can be read, in a digital-type fashion, while at the same time not being long enough to confuse the guidance system into thinking it has encountered a branch portion showing the second frequency. Where fluorescent element is available radiating at third, fourth or other frequencies, then clearly the possibilities for encoding information into the fluorescent element 30 are greatly increased.

Figure 2:
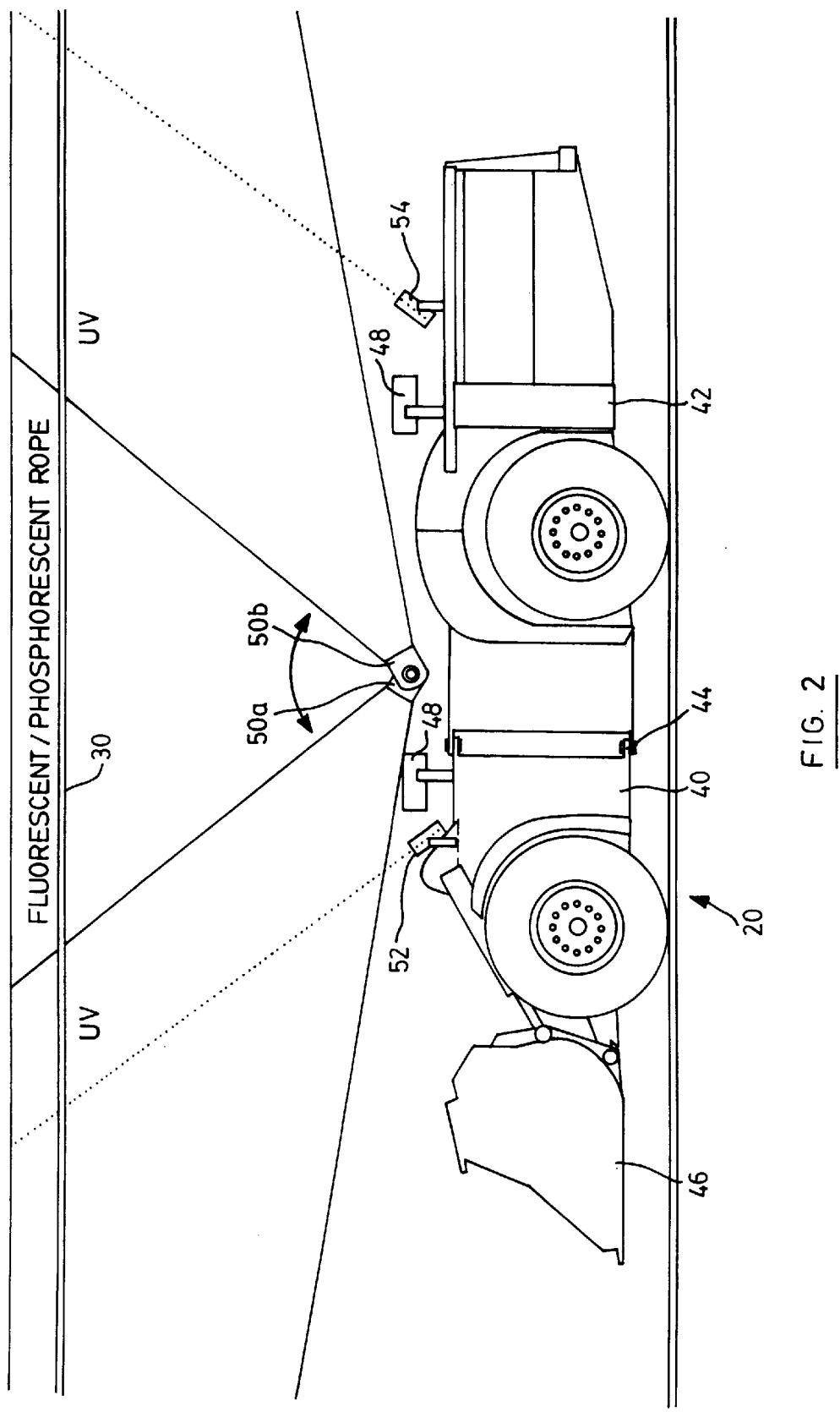
FIG. 2 is a side view of a mining vehicle travelling down a drift utilizing a guidance system in accordance with the present invention.

Reference will now be made to FIG. 2, which shows an exemplary LHD vehicle 20. The LHD vehicle 20 is largely conventional, and accordingly is described in outline only. The vehicle 20 has a front portion 40 and a rear portion 42, which are articulated together by a central pivot 44. A scoop or bucket 46 is mounted at the front end and can be lifted, raised, tipped etc., by way of hydraulic cylinders. At the rear of the rear portion 42, there is a drive unit. Head lamps 48 are provided for illuminating a drift along which the vehicle is travelling.

Now in accordance with the present invention, an ultraviolet lamp 50 is provided and mounted generally centrally on the vehicle 20. As shown, the lamp 50 is pivotable between a position 50a pointing forward and a position 50b pointing rearwards. A length of the fluorescent element or rope 30 is shown in FIG. 2. The lamp 50 illuminates a substantial length of the element 30. In known manner, it is highly desirable to illuminate a substantial length of the element 30 ahead of the direction of travel. Thus, the lamp 50 is directed into position 50a for forward travel.

Then, the element 30 fluoresces and radiates visible light, for example of an orange colour.

Forward and rearward television cameras 52 and 54 are provided, for use during forward movement and rearward movement respectively. For forward motion, the length of the element 30 radiating the orange light ahead of the vehicle is picked up by the camera 52. The camera 52 is provided with a filter to filter out other frequencies, and in particular to filter out the ultraviolet light.

Accordingly, as no other piece of equipment in the drift of the mine should fluoresce in the same manner, the image received by the television camera 52 or 54 is essentially a wholly dark background showing a bright strip where the elongate element 30 is present. This provides an extremely clear and precise guidance line for the guidance system, and there should be no difficulty with interference from unwanted objects or signals. The cameras 52 and 54 thus provide detection means that provide positional information, indicating the position of the vehicle 20 relative to the element 30. Where various portions of the element are provided which radiate in different frequencies, then the cameras 52, 54 should be filtered so as to filter out the excitation frequency of the ultraviolet light, but to permit reception of all the possible frequencies. The different branches can then be identified, by electronically filtering the resultant image.

Where it is desired to have the headlights 48 operational, this may possibly cause interference. Thus, if the frequencies radiated by the element 30 are in the visible spectrum, them there may be strong interference signals caused by lamps 48; for example, there may be duct work, cabling etc., which presents a strong linear image and which may accidentally be coloured so as to reflect an interfering frequency or wave length.

To allow for this, a further aspect of the invention, detailed below in relation to the control circuitry, is to pulse the light from the ultraviolet lamp 50 at a certain excitation frequency. This excitation frequency should be chosen bearing in mind the properties of the element 30. In particular, the spacing between the pulses should be sufficient to permit all the radiation from the element 30 to be radiated, and to allow for any phosphorescent characteristics of the material used. Then, the television camera 52 or 54 will receive, for each of the radiated frequencies of the element 30, a series of spaced pulses. These can be passed through a filter, so as to filter out any continuous interfering signals, as any such interfering signals caused by the continuously running headlights 48 will similarly be continuous.

Figure 3:
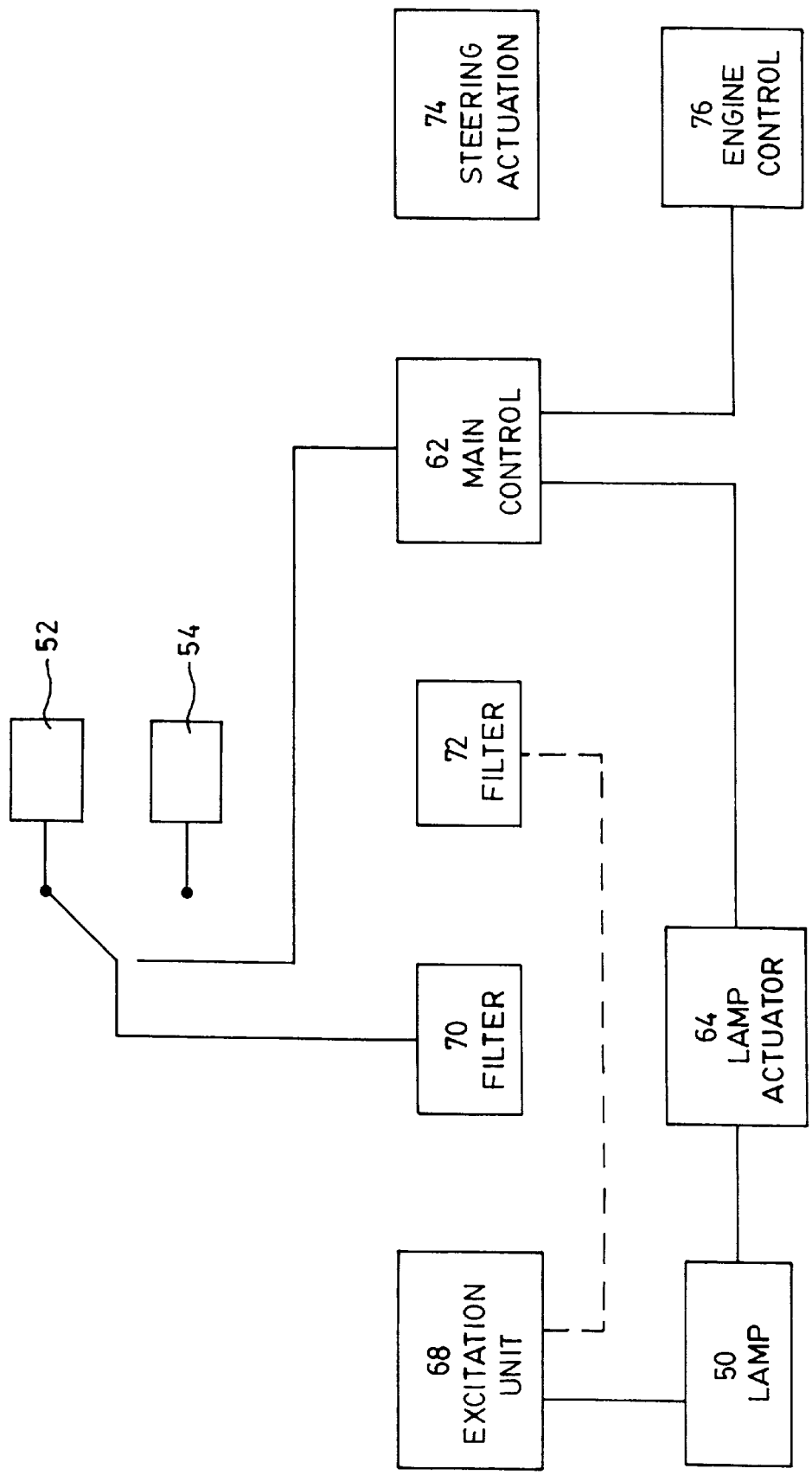
FIG. 3 is a schematic of a control circuit for the vehicle shown in FIG. 2.

Referring now to FIG. 3, a control circuit is shown schematically. It will be appreciated that the basic principles of controlling such LHD vehicles 20 are well known and can be conventional. The present invention is solely concerned with the issue of providing a clear indication of the path that the vehicle should follow. The control circuit is indicated generally by the reference 60, and is shown with the ultraviolet lamp 50 and the television cameras indicated generally at 52, 54. A main control unit 62 controls an ultraviolet lamp actuator 64 and a television camera select a switch 66. Thus, a signal from the control unit 62 is used to switch the ultraviolet lamp 50 between its forward and rearward positions 50a, 50b, and simultaneously switch the selector switch 66 between the forward and rear video cameras 52, 54.

The lamp 50 is driven by an excitation unit 68, which like all elements in the control circuitry is powered by the vehicle electrical system.

The selector switch 66 has an output connected to a first filter 70, for filtering out the ultraviolet frequency provided by the lamp 50. This filter may alternatively be provided by an optical filter. This filter 70 is connected through to the main control unit 62.

Where the excitation units 68 pulses the ultraviolet lamp, then a second filter 72 is provided, to filter out frequencies below that excitation frequency, and particularly any constant or DC component. It may well be possible to combine the filter 70, 72 together as a single filter, as a single bandpass filter that rejects the ultraviolet frequency, and low frequencies including a DC component, while passing all possible frequencies that may be radiated by the different fluorescent elements. For some applications, it may prove advantageous to have a feed from the excitation signal from the unit 68 connected through to the filter 72, to provide improved filtering.

The effect of the processing through the filters 70, and 72 as present, is to provide an image in the direction of which the vehicle is travelling showing a clear indication of the different branches ahead. The control unit 62 processes these image signals and drives a steering actuation unit 74 accordingly. It can also be connected to a vehicle engine control unit 76 as shown. The main purpose of this is to enable the vehicle speed to be controlled, so that the vehicle can be slowed when approaching sharp corners, and then accelerated again once the corner has past. In known manner, the steering control unit drives hydraulic actuators that cause the front and rear portions 40, 42 to pivot relative to one another.

The elongate fluorescent element 30 can be formed of any suitable material. Conveniently, it comprises an elongate plastic tube with fluorescent material embedded therein and having an external diameter of 12 mm with a thickness of approximately 2 mm. Such material is inexpensive and readily available, and is commonly used in the entertainment industry. It will be appreciated that, depending upon the particular environment, other materials could be used. Thus, the elongate element could be in the form of a woven rope.

The elongate fluorescent element should preferably be flexible, so as being capable of being provided as a continuous reel, and readily mounted where required.

The element 30 is attached to the roof of a mine and any length between support points for the element 30 should be chosen depending upon its characteristics and the nature of the installation. In other words, the resultant hanging loop should be such as to not be large enough to interfere with travel of the vehicle or affect the guidance of the vehicle.

While it is preferred for the element 30 to be suspended along the roof of a mine, this is not essential. It could certainly be suspended along the wall of a drift or tunnel, and the vehicle guided so as to maintain a fixed distance from the element 30. This arrangement is also suitable for installations other than closed mines, e.g. in open cast mines or other industrial settings.

In less harsh environments, particularly where the surface will not be so cluttered or subject to coverage with debris, it is conceivable that the element could be provided on the ground, preferably embedded. In factories and the like, it could be provided as a painted strip on a floor. For many applications this may be suitably durable, and may simply need to be repainted at required intervals.

We claim:

1. A vehicle guidance system, for use with a vehicle which includes at least one steerable wheel and steering actuation means for steering each steerable wheel, the vehicle guidance system comprising: an elongate element aligned with a desired path for the vehicle, said elongate element being mounted along the path, and said elongate element comprising a first portion which includes a fluorescent material which absorbs radiation at a first frequency and radiates radiation at a second, lower frequency, and at least one other portion which includes a fluorescent material which absorbs radiation at the first frequency and radiates radiation at another frequency different from the second frequency and the frequency of radiation emitted from each other portion; illumination means for mounting on the vehicle and for illuminating the elongate element with radiation at the first frequency; detection means, for mounting on the vehicle, and for receiving and detecting radiation from the elongate element to provide positional information, indicating a position of the vehicle relative to the elongate element; a main control unit for determining the location of the vehicle relative to the desired path from the positional information from the detection means, and for controlling the steering actuation means to cause the vehicle to follow the desired path, the main control unit being adapted for connection to the detection means and the steering actuation means, and the detection means and the main control unit being adapted to distinguish between different frequencies of radiation radiated by said portions of the elongate element.

2. A vehicle guidance system as claimed in claim 1, wherein the elongate element is flexible and adapted to be suspended from at least one of a roof and a wall around the desired path.

3. A vehicle guidance system as claimed in claim 2, wherein the elongate flexible element is suspended from the roof directly above the desired path.

4. A vehicle guidance system as claimed in claim 2, wherein the elongate element comprises a tube formed from plastics material with the fluorescent material embedded in the plastics material.

5. A vehicle guidance system as claimed in claim 1, wherein along the path, at desired locations, there are provided a plurality of different portions of the elongate element having different radiation frequencies, which are configured to provide information to the main control unit.

6. A vehicle guidance system as claimed in claim 1, wherein each portion of the elongate element is associated with a respective path, and wherein the main control unit utilizes the different frequencies received from the different portions of the elongate element to distinguish the different paths from one another and to guide the vehicle along the desired path.

7. A vehicle guidance system as claimed in claim 1, which includes an excitation means for driving the illumination means, which excitation means causes the illumination means to provide a series of pulses at a known, control frequency, and wherein the system includes a filter means for filtering out signals outside the control frequency, thereby to remove any interfering signals, said filter means being connected between the detector means and the main control unit.

8. A vehicle guidance system as claimed in claim 7, wherein the detection means comprises a video camera means, which provides control information to the main control unit in the form of data representing an image indicating the relative location of the elongate element to the vehicle.

9. A vehicle guidance system as claimed in claim 8, which includes a first video camera means for movement in a forward direction and a second video camera means for movement in a rearward direction, a selection switch for selectively connecting one of the video cameras to the main control unit, wherein the illumination means is movable between forward and rearward facing positions and an illumination means actuator is provided for moving the illumination means between the forward and rearward facing positions, and wherein the main control unit is connected to and controls the selection switch and the illumination means actuator.

10. A method of remotely guiding a vehicle, the method comprising the steps of:
   (a) providing an elongate element comprising a first portion which includes a fluorescent material which absorbs radiation at a first frequency and radiates radiation at a second, lower frequency, and at least one other portion which includes a fluorescent material which absorbs radiation at the first frequency and radiates radiation at another frequency different from the second frequency and the frequency of radiation emitted from each other portion, and aligning said portions of the elongate element with a desired path for the vehicle;
   (b) propelling a vehicle along the desired path;
   (c) illuminating the elongate element with radiation of the first frequency;
   (d) detecting radiation emitted from the elongate element and distinguishing between the different radiated frequencies from said portions of the elongate element to determine the position of the vehicle relative to the elongate element and thereby to determine the vehicle's position relative to the desired path; and
   (e) in dependence upon the vehicle's relative position to the desired path, steering the vehicle, so that the vehicle travels along the desired path.

11. A method as claimed in claim 10, wherein steps (c), (d) and (e) are effected by equipment mounted on the vehicle.

12. A method as claimed in claim 11, which includes providing, along the desired path, alternating portions of the elongate element, to encode information, which information is read by the vehicle.

13. A method as claimed in claim 12, wherein the different portions of the elongate element are used along different branches of the desired path, whereby the different branches can be identified and the vehicle steered along the desired branch by the different frequencies emitted from each portion of the elongate element.

14. A method as claimed in claim 11, which includes, in step (c), modulating the illumination at an excitation frequency so that the first frequency comprises a series of pulses, and wherein step (d) comprises detecting a corresponding series of pulses at the second frequency, and filtering out any signal at the second frequency which is not modulated by the excitation frequency, thereby to eliminate interfering signals.

15. A vehicle guidance system, for use with a vehicle which includes at least one steerable wheel and steering actuation means for steering each steerable wheel, the vehicle guidance system comprising: an elongate element aligned with a desired path for the vehicle, mounted along the path and including a fluorescent material which absorbs radiation at a first frequency and radiates radiation at a second, lower frequency; illumination means for mounting on the vehicle and for illuminating the elongate element with radiation at the first frequency; detection means, for mounting on the vehicle, and for receiving and detecting radiation from the elongate element at the second frequency to provide positional information, indicating a position of the vehicle relative to the elongate element; a main control unit for determining the location of the vehicle relative to the desired path from the positional information from the detection means, and for controlling the steering actuation means to cause the vehicle to follow the desired path, the main control unit being adapted for connection to the detection means and the steering actuation means; an excitation means for driving the illumination means, which excitation means causes the illumination means to provide a series of pulses at a known, control frequency; a filter means for filtering out signals outside the control frequency, said filter means being connected between the detector means and the main control unit.

16. A vehicle guidance system as claimed in claim 15, wherein the elongate element is flexible and adapted to be suspended from at least one of a roof and a wall around the desired path.

17. A vehicle guidance system as claimed in claim 16, wherein the elongate flexible element is suspended from the roof directly above the desired path.

18. A vehicle guidance system as claimed in claim 16, wherein the elongate element comprises a tube formed from plastics material with the fluorescent material embedded in the plastics material.

19. A vehicle guidance system as claimed in claim 15, wherein the detection means comprises a video camera means, which provides control information to the main control unit in the form of data representing an image indicating the relative location of the elongate element to the vehicle.

20. A vehicle guidance system as claimed in claim 19, which includes a first video camera means for movement in a forward direction and a second video camera means for movement in a rearward direction, a selection switch for selectively connecting one of the video cameras to the main control unit, wherein the illumination means is movable between forward and rearward facing positions and an illumination means actuator is provided for moving the illumination means between the forward and rearward facing positions, and wherein the main control unit is connected to and controls the selection switch and the illumination means actuator.

* * * * *